(12) United States Patent
Rao et al.

(10) Patent No.: US 10,765,999 B2
(45) Date of Patent: Sep. 8, 2020

(54) TREATMENT OF INDUSTRIAL WATER SYSTEMS

(71) Applicant: Ecolab USA Inc., St. Paul, MN (US)

(72) Inventors: Narasimha M. Rao, Naperville, IL (US); Steven R. Hatch, Naperville, IL (US); William A. Von Drasek, Oak Forest, IL (US)

(73) Assignee: Ecolab USA Inc., Saint Paul, MN (US)

( * ) Notice: Subject to any disclaimer, the term of this patent is extended or adjusted under 35 U.S.C. 154(b) by 189 days.

(21) Appl. No.: 15/705,572

(22) Filed: Sep. 15, 2017

(65) Prior Publication Data

US 2018/0001262 A1 Jan. 4, 2018

Related U.S. Application Data

(63) Continuation of application No. 13/412,800, filed on Mar. 6, 2012, now abandoned.

(51) Int. Cl.
| | | |
|---|---|---|
| *B01D 61/00* | (2006.01) | |
| *C02F 1/00* | (2006.01) | |
| *C02F 1/68* | (2006.01) | |
| *C02F 1/44* | (2006.01) | |
| *C02F 103/02* | (2006.01) | |
| *C02F 103/18* | (2006.01) | |
| *C02F 103/28* | (2006.01) | |
| *C02F 103/36* | (2006.01) | |
| *C02F 103/42* | (2006.01) | |

(52) U.S. Cl.
CPC .............. *B01D 61/00* (2013.01); *C02F 1/008* (2013.01); *C02F 1/686* (2013.01); *C02F 1/687* (2013.01); *B01D 2311/10* (2013.01); *B01D 2311/14* (2013.01); *B01D 2311/16* (2013.01); *B01D 2311/18* (2013.01); *B01D 2311/243* (2013.01); *C02F 1/44* (2013.01); *C02F 2103/023* (2013.01); *C02F 2103/18* (2013.01); *C02F 2103/28* (2013.01); *C02F 2103/365* (2013.01); *C02F 2103/42* (2013.01); *C02F 2209/006* (2013.01); *C02F 2209/01* (2013.01); *C02F 2209/02* (2013.01); *C02F 2209/04* (2013.01); *C02F 2209/06* (2013.01); *C02F 2209/11* (2013.01); *C02F 2209/40* (2013.01)

(58) Field of Classification Search
None
See application file for complete search history.

(56) References Cited

U.S. PATENT DOCUMENTS

| | | | |
|---|---|---|---|
| 4,087,360 A | 5/1978 | Faust et al. | |
| 4,460,472 A | 7/1984 | Kapiloff et al. | |
| 4,992,380 A | 2/1991 | Moriarty et al. | |
| 5,522,660 A | 6/1996 | O'Dougherty et al. | |
| 5,736,405 A | 4/1998 | Alfano et al. | |
| 6,146,538 A | 11/2000 | Martin | |
| 6,255,118 B1 | 7/2001 | Alfano et al. | |
| 6,280,635 B1 | 8/2001 | Moriarty et al. | |
| 6,315,909 B1 | 11/2001 | Hoots et al. | |
| 6,387,251 B1 | 5/2002 | Marsiglietti et al. | |
| 497,822 A1 | 12/2002 | Blanchette et al. | |
| 6,497,822 B2 | 12/2002 | Blanchette et al. | |
| 6,685,840 B2 * | 2/2004 | Hatch | C02F 1/688 210/739 |
| 6,901,945 B2 | 6/2005 | Adams et al. | |
| 7,448,255 B2 | 11/2008 | Hoot et al. | |
| 7,875,720 B2 | 1/2011 | Morris et al. | |
| 2003/0141258 A1 | 7/2003 | Hatch | |
| 2004/0154965 A1 | 8/2004 | Baum et al. | |
| 2007/0090059 A1 | 4/2007 | Plummer et al. | |
| 2008/0000287 A1 | 1/2008 | Hoots et al. | |
| 2008/0105621 A1 | 5/2008 | Johnson et al. | |
| 2009/0139545 A1 | 6/2009 | Rowlands et al. | |
| 2010/0028202 A1 | 2/2010 | Wan et al. | |
| 2013/0233796 A1 | 9/2013 | Rao et al. | |

FOREIGN PATENT DOCUMENTS

| | | |
|---|---|---|
| CN | 1308232 A | 8/2001 |
| CN | 101424672 A | 5/2009 |
| CN | 101943919 A | 1/2011 |
| CN | 102004461 A | 4/2011 |
| CN | 201812213 U | 4/2011 |
| DE | 19847275 A1 | 4/2000 |
| EP | 0624798 A1 | 11/1994 |

OTHER PUBLICATIONS

Amjad et al. "Selection and application of deposit control polymers as iron stabilization agents in industrial water treatment programs" (Assc. Water Tech., Colorado Springs, CO, Nov. 2007). (Year: 2007).*
Alley, "Controlling Corrosion and Scaling in Industrial Waters," Retrieved from the Internet: https://www.waterworld.com/home/article/16211281/controlling-corrosion-and-scaling-in-industrial-waters, dated Jan. 1, 2008, 5 pages.

(Continued)

*Primary Examiner* — Ryan B Huang
(74) *Attorney, Agent, or Firm* — Fredrikson & Byron, P.A.

(57) ABSTRACT

A method for controlling treatment of an industrial water system is disclosed. The method comprises the steps of providing an apparatus for controlling delivery of at least one treatment chemical, the apparatus comprising at least one sensor and an electronic input/output device carrying out a protocol; measuring a parameter of the industrial water system using the at least one sensor; relaying the measured parameter to the electronic device; adjusting the protocol based on the measured parameter; delivering a concentrated treatment chemical into a stream of the industrial water system according to the adjusted protocol, the concentrated treatment chemical comprising an active ingredient, the active ingredient traced as necessary, the active ingredient having a concentration; repeating the measuring, the adjusting, and the delivering; and optionally repeating the steps for n-number of parameters, n-number of active ingredients, and/or n-number of concentrated treatment chemicals.

20 Claims, 5 Drawing Sheets

(56) References Cited

OTHER PUBLICATIONS

European Patent Office, Extended European Search Report in European Patent Application No. 13757508.0, dated Sep. 15, 2015, 6 pp.
KIPO, International Search Report in International Application No. PCT/US2013/028979, 4 pp., dated Jun. 4, 2013.
KIPO, Written Opinion in International Application No. PCT/US2013/028979, 5 pp., dated May 28, 2013.
Sigma-Aldrich, "1,3,6,8-Pyrenetetrasulfonic acid tetrasodiurn salt," 2 pp., Jan. 9, 2015.
Sigma-Aldrich, "8-Hydroxypyrene-1,3,6-trisulfonic acid trisodium salt," CAS No. 6358-69-6, 1 pg., Mar. 27, 2014.
Wayback Machine Internet Archive, "GE Water & Process Technologies: Chapter 35—Chemical Feed Systems," http://web.archive.org/web/2008, 13 pp., Nov. 17, 2008.

\* cited by examiner

TREATMENT OF INDUSTRIAL WATER SYSTEMS

CROSS-REFERENCE TO RELATED APPLICATIONS

This application is a continuation of U.S. patent application Ser. No. 13/412,800, filed Mar. 6, 2012, the disclosure of which is incorporated herein by reference in its entirety.

FIELD OF THE INVENTION

The invention pertains to treatment of water in an industrial water system. More particularly, the invention pertains to control of treatment of water in an industrial water system.

BACKGROUND

Many industrial water systems, e.g., cooling towers, boilers, forming section of a paper making process, and waste treatment systems use chemical treatment products for improved energy efficiency, waste reduction, asset protection, and improve product quality. Typical treatment products for industrial water systems control scaling, corrosion, fouling, foaming, odor formation, and microbiological growth. These treatment products comprise polymers and other materials and are known to people of ordinary skill in the art of a particular type of industrial water system.

To achieve optimum performance from the chemical treatment products introduced into an industrial water system requires a feed strategy. For example, a typical industrial water system as used in cooling towers will employ a control system that can be set up to feed treatment product based on either a bleed/feed mechanism, where the action of blowdown triggers a chemical feed pump or valve that feeds treatment product; or, in the alternative, the control system feeds treatment product based on timers using a "feeding schedule," or flow meters on the make-up water line trigger the pumping of treatment product based on a certain amount of make-up water being pumped. A limitation of these control methods is that none of these systems measure the treatment product concentration directly online, so if there is a mechanical problem, for example, if a pump fails, a drum empties, or high, low or unknown blowdown occurs, system volume changes or makeup water quality changes; the correct treatment product concentration is not maintained. Because this problem is common, typically industrial water systems are either overfed to ensure the level of treatment product in the system does not drop too low as a result of high variability in product dosage, or the treatment product is unknowingly underfed. Both overfeeding and underfeeding of treatment product are undesirable due to cost and performance drawbacks.

One method of combatting these undesirable drawbacks is by blending an additive blend that includes an inert fluorescent chemical and an active ingredient blended in known proportion to one another, adding the additive blend to the industrial water system, and monitoring the fluorescent signal of the inert fluorescent chemical using a fluorometer. The typical industrial water system may require several additive blends, which would make up an additive package. As a person of skill in the art readily recognizes, the typical additive blend or package for an industrial water system must first be formulated, then blended and inventoried prior to its shipment and use by the end user. Because of the endless possible design variations of industrial water systems, there may be as many additive blends and packages as there are industrial water systems. Furthermore, a process can exhibit dynamic variations, e.g., changes in makeup water composition that feeds a cooling tower, seasonal changes, etc., requiring reformulation of the blend to achieve optimum performance. The typical industrial water system may require several of these additive blends to function properly, and each can be properly dosed into the industrial water system using a control apparatus such as TRASAR® Technology or 3D TRASAR® Technology, each available from Nalco Company, 1601 West Diehl Road, Naperville, Ill. 60563. All of these additive blends are typically formulated using one or more of several common raw materials.

Those who produce additive blends encounter several issues when blending ("make-clown" or "making-down") a new additive blend or package. First, the cost of formulating a new additive blend or package can be expensive. Several batches may need to be blended and tested to determine the optimal ratio of additives. Not only does the industrial water system require that formulation be done when new, but the formulation will likely need adjusting as the system ages. Such formulation and re-formulation requires significant man-hours.

Second, the make-down of additive blends and packages at full strength can be dangerous. Several of the additives require the use of formulation aids such as strong acids or bases in order to get the active ingredients to dissolve. The additives, when blended at full strength, may release heat or fumes. Additionally, because the blend will likely sit in storage for a lengthy period of time, the blend may require the addition of costly halogen- or photo-stable dyes as tracers.

Systems for blending and feeding liquid chemicals are generally based on one or more sensor technologies such as load cell, level sensor, and volumetric measuring devices to measure the amount of chemical dispensed. In some cases a characteristic measurement of the liquid is used to determine the mixture concentration. For example, U.S. Pat. No. 5,522,660, to O'Dougherty et al., disclosed the use of a conductivity probe to monitor the concentration blend of DI water mixed with a concentrated chemical.

Further, U.S. Patent Application Publication No. 2009/0139545, to Rowlands et al., discusses the use of fast acting solenoid values with a control algorithm to inject super-concentrated chemicals into a water conduit for vehicle washing. The amount of chemical feed is controlled by the solenoid valve on/off timing sequence. Concentrated chemical is injected directly into the conduit and diluted at the point of use, thereby eliminating the need for a dilution step or mixing tank.

Thus, there is a long-felt but unmet need for more efficient delivery of additives used in industrial water systems than currently exists. Ideally, a service provider would avoid off-site formulation and blending altogether by shipping the necessary raw materials to the customer and performing the blending at the customer's site that can provide real-time adjustment and dosage control. More ideally, the make-down would not require the use of halogen- or photo-stable dyes. Even more ideally, the raw materials would be directly injected into the industrial water system at optimum levels without the need for make-down. The invention at hand satisfies this long-felt but unmet need.

SUMMARY OF THE INVENTION

The invention is directed toward a method for controlling treatment of an industrial water system. The method comprises the following steps: providing an apparatus for controlling delivery of at least one treatment chemical, the apparatus comprising at least one sensor and an electronic input/output device carrying out a protocol; measuring a parameter of the industrial water system using the at least one sensor; relaying the measured parameter to the electronic device; adjusting the protocol based on the measured parameter; delivering a concentrated treatment chemical into a stream of the industrial water system according to the adjusted protocol, the concentrated treatment chemical comprising an active ingredient, the active ingredient traced as necessary, the active ingredient having a concentration; repeating the measuring, the adjusting, and the delivering; and optionally repeating the steps for n-number of parameters, n-number of active ingredients, and/or n-number of concentrated treatment chemicals.

These and other features and advantages of the present invention will be apparent from the following detailed description, in conjunction with the figures and appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION/PREFERRED EMBODIMENT

Figure 1:
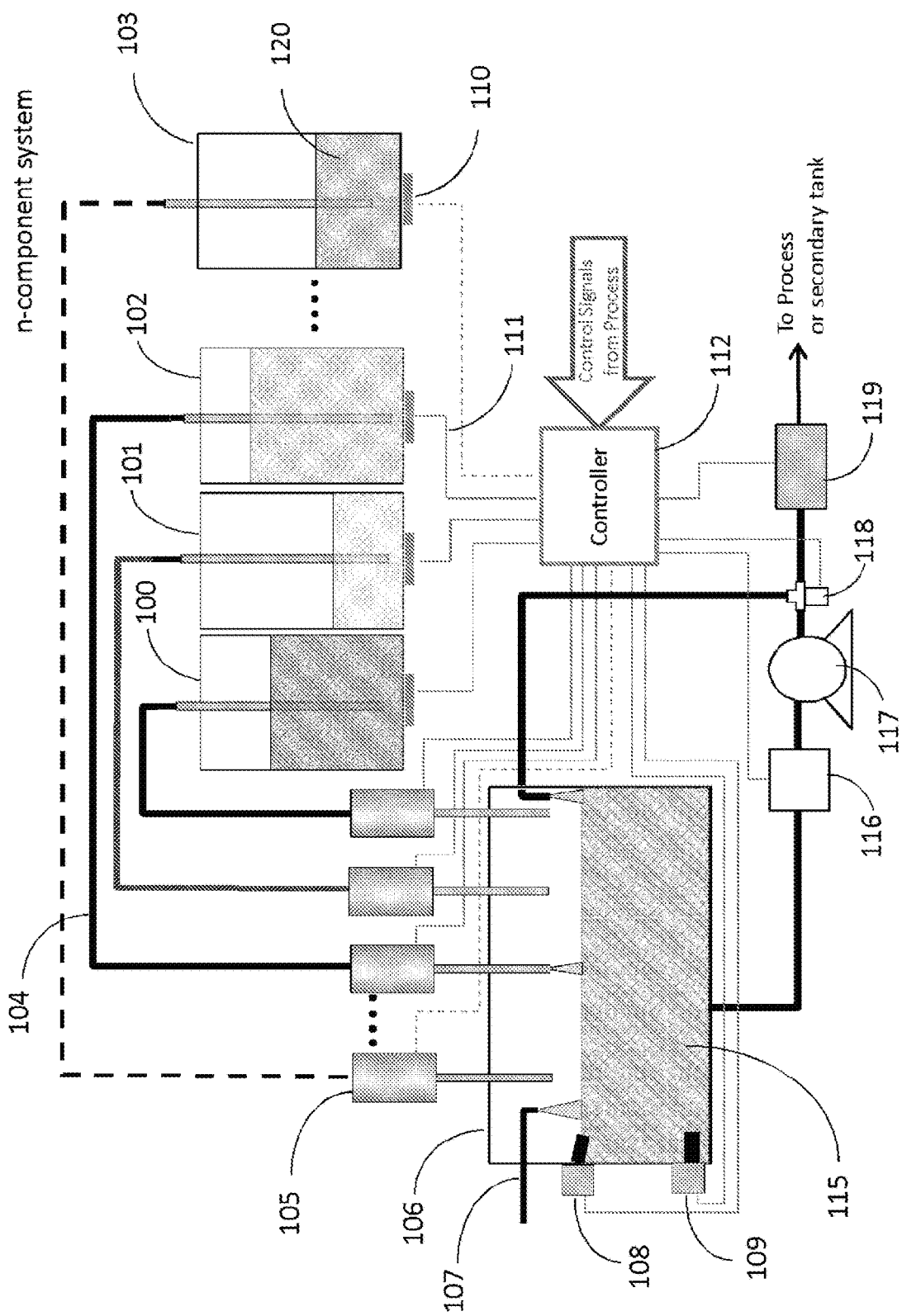
FIG. 1 is a schematic diagram of an embodiment of a batch active blending system for n-components.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description of the Invention," relates to a requirement of the United States Patent Office, and does not imply, nor should be inferred to limit the subject matter disclosed herein.

Definitions

For purposes of this patent application, the following terms have the definitions set forth below:

"Additive" is used interchangeably with the terms "active ingredient" and "active." Additionally, the term "concentrated active ingredient" refers to a chemical that has an additive concentration that is significantly greater than what is employed in a typical package as defined below. A concentrated active ingredient may take the form of a solid or liquid. A concentrated active ingredient is typically "made down" prior to its use as a treatment in an industrial water system. A concentrated active ingredient will typically contain no more than a minimal amount of diluent so that the chemical's cost effectiveness can be maximized.

"As necessary" means if needed. For this patent application, "as necessary" refers to chemicals that, if detected by fluorescence, do not display fluorescent properties. If a measurement can be taken without the need for fluorescence detection, then the chemical will not need to be traced. If a chemical fluoresces on its own, it does not need to be traced with a fluorescing chemical. However, if a chemical does not fluoresce and a user wants to measure the concentration of the non-fluorescing chemical using fluorescence, then the chemical needs to be traced with a fluorescing chemical.

"Blend" means a chemical that has been created by diluting and/or mixing an additive with another chemical and/or water.

"Industrial water system" means any system that circulates water as its primary ingredient. Examples of "industrial water systems" may include cooling systems, heating systems, membrane systems, paper making process or any other system that circulates water as defined above.

"Metering" means dispensing a known quantity of a substance. One way to "meter" a substance is to dispense a substance that has a known concentration of a particular ingredient at a known rate for a period of time. Another way to "meter" a substance is to use analytic technology to determine how much of a substance or an ingredient of a substance is/has been dispensed. Other ways of "metering" are known to those skilled in the art.

"Modular reservoir" means a portable, interchangeable container capable of containing at least one concentrated active ingredient. Ideally, a "modular reservoir" would be easily attached and detached to a system employed to carry out the invention at hand, providing a safe, sustainable, and convenient way to handle the at least one concentrated active ingredient.

"Package" means a group of one or more blends that are added to an industrial water system. An "additive package" for an industrial water system typically includes several blends of active ingredients, tracers, water, and other ingredients.

"Parameter" means a measurable variable that can be used to determine a treatment protocol for a water treatment system. Examples of potential "parameters" include but are not limited to the following: temperature, concentration (including pH and/or alkalinity), fluorescence, surface area, metallurgy, and any other measurable variable known by those skilled in the art.

"Protocol" means a set of instructions that may include concentrations, flow rates, mixing rates, temperatures, volumes, masses, or any number of other criteria known to those skilled in the art. As related to this invention, a "protocol" may control the mixing and/or injection of treatment into the water of an industrial water system. A "protocol" can be created and/or stored using an electronic input-output device, which may be a computer, a PLC controller, or any input-output device programmed with the appropriate software and/or firmware, which communicates the instructions to carry out the "protocol" in an automated fashion. Additionally, the "protocol" includes optimization methods and techniques based on physical models, empirical models, semi-empirical models, or a combination of models to develop a set of instructions.

"Sensor" means a measurement device that measures a parameter and is capable of outputting the measured parameter.

"Traced" means an inert fluorescent chemical mixed in a known proportion with an active component of an additive package so that the concentration of the active component may be determined via the use of a fluorometer to monitor the fluorescent signal of the inert fluorescent chemical. For example, for a dye to be "traced" with another chemical, the dye will be present at a measurable concentration with the other chemical so that the concentration of the dye may be to measured using the dye's fluorescence, allowing the concentration of the other chemical to be determined.

"Water" means any substance that has water as a primary ingredient. Water may include pure water, tap water, fresh water, brine, steam, and/or any chemical, solution, or blend that is circulated in an industrial water system.

Using a measurement and/or control device such as 3D TRASAR Technology, a user can determine a formulation for an additive blend or package that would suit the dynamic conditions of the user's industrial water system. For example, the user may determine that a particular industrial water system needs an additive package that comprises an azole, a dispersant polymer, orthophosphate, phosphonobutanetricarboxylic acid ("PBTC"; optionally a salt thereof), and phosphinosuccinic oligomer ("PSO"). An embodiment of the invention would determine the optimal concentration of the ingredients of the additive package and dose the following raw materials into a vessel: water, phosphoric acid traced with a dye, PBTC traced with a second dye, tolyltriazole ("TT"), PSO traced with a third dye, and a tagged polymer dispersant. The ingredients would be diluted with water and/or a solvent and mixed using one or more techniques known by those skilled in the art. The user could determine the concentrations of the ingredients by weight measurement, by a form of fluorescence or absorption detection, volumetric or level sensing, or by any other method known to those skilled in the art.

The blended additive package is then injected as necessary into the industrial water system by any method known to those skilled in the art. When the vessel becomes somewhat depleted, the process could be repeated as necessary, beginning with determining the optimum additive package composition.

Another example of an embodiment of the invention allows the active ingredients of an additive package to be added directly into the industrial water system rather than by blending prior to being added to the industrial water system. The embodiment is a method for controlling treatment of an industrial water system. The method comprises the following steps: providing an apparatus for controlling delivery of at least one treatment chemical, the apparatus comprising at least one sensor and an electronic input/output device carrying out a protocol; measuring a parameter of the industrial water system using the at least one sensor; relaying the measured parameter to the electronic device; adjusting the protocol based on the measured parameter; delivering a concentrated treatment chemical into a stream of the industrial water system according to the adjusted protocol, the concentrated treatment chemical comprising an active ingredient, the active ingredient traced as necessary, the active ingredient having a concentration; repeating the measuring, the adjusting, and the delivering; and optionally repeating the steps for n-number of parameters, n-number of active ingredients, and/or n-number of concentrated treatment chemicals.

The active ingredients may be injected simultaneously with one or more fluorescing dye, providing the ability to trace the concentration of the active ingredients. Using available analytical tools such as conductivity, corrosion, and/or deposit monitoring in combination with fluorescent tracing technology, the concentrations of active ingredients can be measured directly or indirectly. These measurements allow for control and adjustment of the additive package.

For example, a scale control additive could be added to the industrial water system directly based on real-time measurements linked to the demand of a tagged polymer using fluorescence measurement and feedback control. The scale control additive could alternately use a different measurement scheme to determine the concentration of scaling species, e.g., calcium carbonate and/or calcium phosphate. Yellow metal corrosion inhibitor control could be facilitated by direct azole fluorescence monitoring and feedback control. Ferrous metal corrosion inhibitor control could be maintained by monitoring the concentration of the active ingredients of the additive package in the industrial water system, or these inhibitors could be predicted using key parameters of the system itself Such parameters could include, for example, temperature, pH, alkalinity, etc. Typical active ingredients that would need to be monitored would include phosphinosuccinic oligomer and phosphate.

Optimal performance of the additive blend or dosage amount for direct injection is possible by collecting data on the process and fluid characteristics to input into an optimization algorithm for real-time active component adjustment. The optimization algorithm can be based on a physical model, empirical model such as multiple regression, neural network, state space, autoregressive, etc., or the combination of both physical and empirical models. As an example, characteristic fluid input data for a cooling tower unit operation could include various temperature readings (ambient, inlet, outlet, and basin), pH, alkalinity, conductivity, oxidation-reduction potential ("ORP"), turbidity, etc., all of which can be measured using standard commercially available sensors. Combining this with input on the tower operating conditions such as capacity, number of cycles, recirculation rate, wetted material composition, makeup water quality, etc., and using model software, e.g., thermodynamic product saturation calculations to predict mineral scale potential, an optimal additive blend and/or dosage level is determined.

In formulating an additive blend the starting concentrated raw material can be either a liquid or solid. Similarly, the starting material for direct injection of the active into the process stream can be either a concentrated liquid or a dissolved solid. Use of solid raw materials has the advantage of being easier to handle with less risk from spills as well as decrease shipping costs through weight reduction. The solid can be either in pellet form or powder. Actives in the solid form require the addition of water or other solvent to dissolve the solid forming a concentrated liquid that can then be dispensed. A chemical tracing dye can be added separately to the liquid concentrate or integrated into the active solid and released when dissolved in water with the active. The concentration of the liquid active made by dissolving the solid is known based on the mass of active solid used and volume of solvent added to dissolve the solid. Other methods to determine the concentration can also be used such as optical spectroscopic methods, pH, conductivity, etc. Once in the liquid state, blending follows the same methodology similar to starting with a liquid concentrated active. Furthermore, an automated dispensing device for the active solid can be used to maintain dispensing of the concentrated liquid active over long periods. A combination of liquid and solid active may also be used. For example, if the consumption of an active is high relative to the others and the dispensing volume size is limited, then it may be desirable to use solid actives for ease in handling.

In an embodiment, the industrial water system is selected from the group consisting of: a cooling tower water system; a petroleum well, a downhole formation, a geothermal well, and any other oil field application; a boiler system; a hot water system; mineral process waters comprising mineral washing, flotation and benefaction; a papermaking process; a black liquor evaporator; a gas scrubber; an air washer; a continuous casting process; an air conditioning system; a refrigeration system; a pasteurization process; a water reclamation system; a water purification system; a membrane filtration water system; a food processing stream; and a wastewater treatment system.

In an embodiment, the at least one sensor is selected from the group consisting of: optical spectroscopic measurements such as fluorometric sensor, spectrofluorometric sensor, absorption, and Raman spectroscopic measurement system; a corrosion sensor; a conductivity sensor; a pH sensor; a temperature sensor; a weight sensor; a flow sensor; a load cell; a level detector; a turbidity sensor; an electrical sensor; an electrochemical sensor; an acoustic sensor; multiples thereof combinations thereof; and multiples and combinations thereof.

In an embodiment, the parameter is selected from the group consisting of: a corrosion rate; a scaling rate; a deposition rate; a heat transfer rate; a cooling tower efficiency; a chemical concentration; a cycle of concentration; a suspended solids measurement; a dissolved solids measurement; a microbiological activity rate; a chemical activity rate; a process performance parameter; a product performance parameter; multiples thereof; combinations thereof; and multiples and combinations thereof.

In an embodiment, the method further comprises diluting the concentrated treatment chemical prior to the delivering. The diluting may occur in-stream en route to the delivering. Such in-stream dilution may be carried out using technology such as Nalco Pareto technology, available from Nalco, an Ecolab Company, 1601 West Diehl Road, Naperville, Ill. 60563, or by a venturi with a mixing ratio based on the venture diameter and inlet orifice sizing such as Chem-Flex injector technology from Hydra-Flex Inc., 680 East Travelers Trail, Burnsville, Minn. 55337.

In an embodiment, the concentrated treatment chemical is delivered as a solid.

In an embodiment, the concentrated treatment chemical is delivered as a liquid.

In an embodiment, the concentrated treatment chemical comprises at least two active ingredients.

In an embodiment, the concentrated treatment chemical is further comprised of a dye, the active ingredient traced with dye.

In an embodiment, the active ingredient is a polymer tagged with a fluorescent moiety.

In an embodiment, the active ingredient is inherently fluorescent.

In an embodiment, the apparatus further comprises a modular delivery system.

In an embodiment, the protocol comprises an algorithm based on calculations selected from the group consisting of: a first principle; an empirical observation; multiples thereof; combinations thereof; and multiples and combinations thereof For example, the types of algorithms may include, but are not limited to, the group consisting of: a cooling water algorithm; a boiler water algorithm; a corrosion algorithm; a pH algorithm; a conductivity algorithm; a temperature dependency algorithm; a turbidity algorithm; a water hardness algorithm; a scaling algorithm; a heat transfer rate algorithm; a microbiological activity algorithm; a chemical activity algorithm; a chemical demand algorithm; multiples thereof; combinations thereat and multiples and combinations thereof

EXAMPLES

The following examples are meant to illustrate several embodiments and aspects of the invention at hand to a person of skill in the art. These examples are not to be construed as limiting beyond the scope of the allowed claims. The examples are prophetic in nature, and those skilled in the art will recognize that the features described in any single example can be incorporated into any of the other examples as necessary.

Example 1

The first example illustrates injection of the additive package made up from a set of different actives blended in a holding vessel at a predetermined composition for a given batch. Once the additive package is made it can then be dispensed into the process stream. The composition of the additive package is adjusted during the blending step by controlling the individual actives dispensed to the holding vessel. A schematic layout is shown in FIG. 1 for an n-component delivery system. The concentrated actives used in formulating the blend are isolated from one another by containers 100, 101, 102, and n-container 103. The containers can be any suitable material either hard wall or flexible, e.g., polymer bag, that is chemically compatible with the concentrated active. The containers can be modular allowing the user to easily remove and replace the container with the same or different active component, thus providing added flexibility in the composition of the additive package. A blend is made by extracting a controlled amount of active from the container through delivery line 104 using a fluid dispensing device 105. The fluid dispensing device 105 used can be any technology typically used for liquids that include but not limited to mechanical pumping, venturi injector, gravity feed, or displacement methods that such as direct pressurizing the container ,bladder system, or progressive cavity displacement.

The active fluid dispensed is sent to mixing tank 106 equipped with a level sensing measurement device 108 and 109 that sends a signal to the controller 112 when tank 106 reaches a targeted set point level such as empty, full, or at a critical level to trigger a change in fluid dispensed. The level monitoring device can be a simple float type level switch mounted at discrete locations on mixing tank 106 or an inductive float level sensor with multiple discrete trigger points. Alternatively, an ultrasonic or other noncontact method can be used to measure the level over a continuous range. Additional contact sensors or alarming signals from noncontact level measurements can be used as means to monitor and control intermediate fluid levels during the additive blend construction step. For example, it may be desirable to add water or solvent to mixing tank 106 after dispensing an active fluid to dilute the active before the addition of a second active component. The addition of water, solvent, or combination of fluids is added to tank 106 through nozzle 107. Nozzle 107 can be located above the fluid level in the mixing tank 106 or positioned at the bottom or side of the mixing tank and may include an educator nozzle to promote turbulence for enhanced mixing of the additive package.

Controlling the amount of additive dispensed to mixing tank 106 is regulated by controller 112. At the lowest level controller 112 controls and tracks the sequence of values and sensors, e.g., load cell, level sensor, flow meter, electrochemical sensor, or combination thereof;

to construct an additive blend based on a preprogramed procedure for a given blend. Adjustment to the additive blend can be made by manually changing settings to control dispensing devices and set-point values. Alternatively, controller 112 can operate at higher levels of functionality to include process operating conditions and process fluid characteristics to optimize the blend composition. Furthermore, remote access to the controller through a WIFI or Ethernet connection allows communicating to the controller remotely to adjust settings or download additional information, e.g., water ion composition analysis results, for use with an optimization model to determine and adjust the additive composition.

Independent of the method used to dispense the active into the mixing tank; a method to monitor the amount of active dispensed is required to control the desired final composition of the additive blend. Conventional methods to monitor the amount of active dispensed include direct weight measurement as illustrated in FIG. 1 with load cell 110 used on each active container, volumetric flow metering of the dispensed liquid over a known period of time, or level sensor to measure the change in liquid level. These conventional techniques are suitable provided the dynamic response and resolution of the sensor matches the system demands. For example, if the required amount of active dispensed is only 0.1 g from a 10.0-kg container, then monitoring and control of the dispensed fluid requires a high precision mass or level sensor with enough resolution to accurately measure and track the amount of active dispensed. Using high precision instrumentation to monitor active dispensing is costly and susceptibility to higher maintenance when exposed to industrial environments that experience temperature and humidity changes. In addition, care is needed to isolate the load cell from neighboring vibration sources such as pumps that can add noise to the measured signal reducing precision and accuracy.

Attaining the required measurement resolution from standard load cells is possible by sizing the dynamic range to the application. For example, dispensing a 1 g sample from a 1000 g supply container requires a much higher performing load cell compared to dispensing 1 g from a 10 g supply container. However, reducing the active volume available for dispensing also increases the frequency the actives must be replaced. Frequent replenishment of the active is not advantageous because it requires more user interaction with the system, increases the probability of operating without the system being replenished, and can lead to higher shipping and packaging costs due to frequent replacement.

Figure 2:
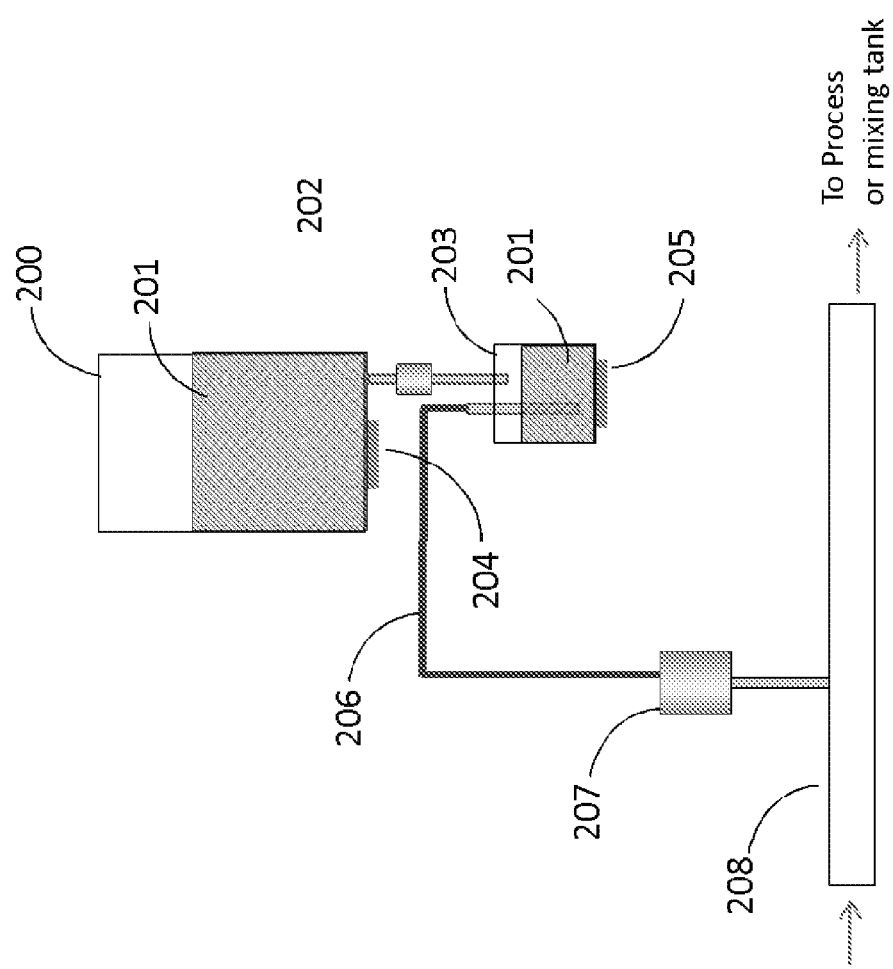
FIG. 2 is a schematic diagram of an embodiment of a staged dispensing system using a load cell for high resolution dispensing control.

To extend the time between replenishing concentrated actives and maintain a high resolution measurement for dispensing small volumes a secondary dispensing stage, as shown in FIG. 2 for a single component concentrated active subassembly, addresses this issue. Container 200 is sized accordingly with concentrated active 201 to last an acceptable period of time for a given dosage and maintenance schedule. The concentrated active is dispensed to a second smaller container 203 through dispensing device 202, which can be but not limited to gravity feed, mechanical pump, or venturi type device. The signal from load cell 205 is used to monitor when container 203 needs replenishment as well as control the amount of active dosed to the process. Dosing is made by drawing the active through transfer line 206 using a dispensing device 207, which can be but not limited to gravity feed, mechanical pump, or venturi type device. The dispensed active can then be transferred to the process 208, stored in a tank for later use, or to a mixing tank to make an additive blend.

An alternative approach to monitor the amount of active added to tank 106 is based on monitoring the direct fluorescence of the active or an inert fluorophore that is mixed with an active at a known proportional amount. In this case, pump 117 shown in FIG. 1 circulates the additive from tank 106 through fluorometer 116. The circulating pump 117 also promotes additional mixing of the blend, which can be further enhanced with the addition of a mixing educator nozzle. A three-way solenoid valve 118 can be used to isolate the fluorometer and additive mixing step from the process. Once the additive package is ready for dispensing, valve 118 is switched to direct the additive blend to the process.

The gain setting on fluorometer 116 can be variable with automatic adjustment to set the fluorometer dynamic range so that the same fluorometer channel is used for both blending the additive package, which is at high concentration compared to the actives, and monitoring fluorescence from actives in the diluted process stream. Alternatively, a dedicated channel or sensor with a preset gain can be used. In this case, a single excitation source is used and fluorescence monitoring is performed with one sensor adjusted for the higher concentration range of the additive blend and the second sensor adjusted for a lower concentration range to monitor the additive diluted in the process.

To monitor multiple actives by fluorescence at different wavelengths, a dispersive or non-dispersive fluorometer can be used. When using a non-dispersive fluorometer, dedicated excitation sources and detector assembles with appropriate bandpass filter is needed for each wavelength range detected. Using a dispersive system simplifies the number of detectors needed by monitoring the emitted fluorescence of each species on an array detector. To minimize interference from multiple excitation sources and fluorescence from actives or inert dyes, phase sensitive detection techniques can be applied as well as using bandpass filters. Finally, monitoring fluorescence from highly concentrated actives can be problematic due to self-absorption and quenching. In this case, reflectance fluorescence monitoring is the preferred choice with the excitation light incident on the medium with the emitted fluorescence collected in the reflectance mode. For example, a bifurcated fiber can be used to deliver the excitation light through one leg of the fiber and collect emitted fluorescence through the other leg directed to either a dispersive or non-dispersive detection system.

To illustrate the concept for using an additive blend, a cooling water unit operation example is presented. Table 1 lists the target components and concentrations for an additive blend consisting of the following three actives: THSP and TT for corrosion control and 1-hydroxyethane 1,1-diphosphonic acid ("HEDP") for scale control. In the first approach, the blend is made by monitoring the fluorescence signal from an inert tracing fluorophore added to the active or measuring the fluorescence of the active directly. For this example, direct fluorescence monitoring of TT and THSP is possible; however, for HEDP monitoring, an inert water soluble fluorophore is needed as a tracer such as pyrene sulfonic acids including 1,3,6,8 pyrenetetrasulfonic acid sodium salt ("PTSA"), 8-hydroxy 1,3,6-pyrene trisulfonic acid sodium salt, and pyrenesulfonic acid (mono) sodium salt. The tracer is added to the HEDP at a known concentration to give a fluorescence signal that is proportional to the HEDP concentration. In cases that require the addition of tracing dye to monitor an active component, the tracing dye can be premixed with the active during manufacturing or added at the point-of-use. The addition of the inert dye, e.g., PTSA, with HEDP serves in both constructing the additive blend and used to set a baseline dosing level to monitor the process, as typically done when using Nalco 3D TRASAR technology.

TABLE 1

List of active components for additive package.

| Active | Concentrated Active (%) | Target Additive Blend Concentration (%) |
|---|---|---|
| 1-Hydroxyethylidene-1, 1-diphosphonic acid | 62 | 10 |
| Tolyltriazole (TT) | 35 | 1 |
| Poly acrylic acid tagged dispersant (THSP) | 35 | 7 |

Example 2

Figure 3:
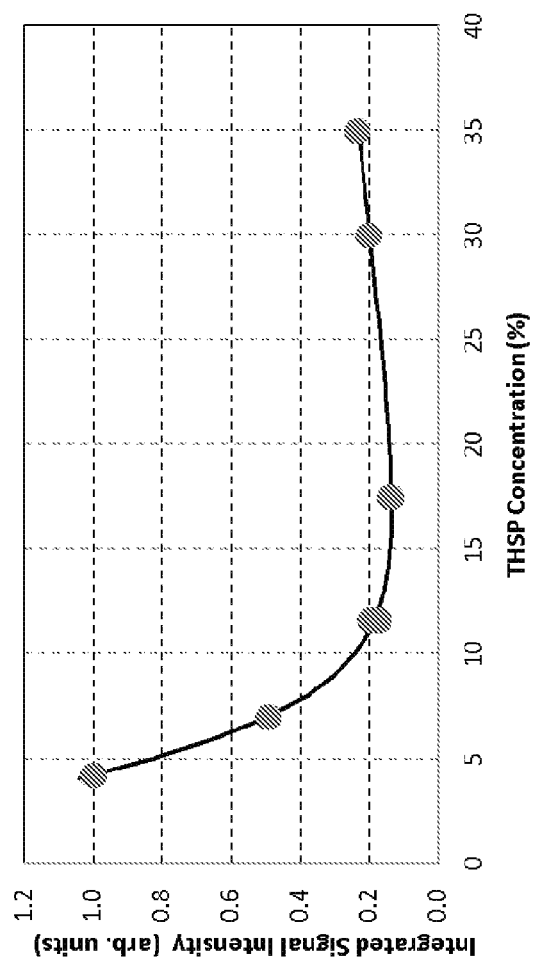
FIG. 3 is a plot showing the integrated fluorescence signal intensity for poly acrylic acid tagged dispersant ("THSP") at different concentrations in water.

In the previous example, multiple component monitoring requires a fluorometer having different excitation source wavelengths and detection channels. An alternative approach of the invention is based on monitoring the fluorescence from one component during sequential steps of adding the different active components. For example, to construct the additive package listed in Table 1 the steps listed in Table 2 can be followed to make a 1.0-liter blend. Using THSP as the baseline fluorescence signal the additive package is constructed by measuring the change in the THSP signal. Because THSP is initially highly concentrated the fluorescence signal is nonlinear, as shown in FIG. 3 for the integrated intensity collected using a bifurcated fiber optic probe. For this example, one fiber optic leg supplies the excitation light at 365 nm that propagated through fiber and exits the probe which is submerged into the fluid. Light exiting the probe excites the THSP molecules resulting in fluorescence emission collected at the probe tip where one fiber (or bundle of fibers) transports the emitted radiation to a spectrometer for analysis. Because of the quenching and self-absorption present for high concentrated solutions, the integrated fluorescence spectra shows a non-linear behavior, as shown in FIG. 3, for a range of THSP concentrations in water. Therefore, a concentration range must be selected where the fluorescence response is sensitive to concentration changes.

To construct a 1.0-liter additive blend based on the THSP spectral response in water, the sequence of steps listed in Table 2 are developed to predict the fluorescence response resulting from the addition of each additive. First, 611 ml of water is added to mixing tank 106 followed by partial addition of 100 ml THSP. The amount of THSP added to the mixing tank 106 is controlled by either the dispensing device 105 or a level sensor 108/109. Only a portion of the THSP is added in the first step to dilute the THSP concentration thereby shifting the integrated fluorescence response to a more concentration sensitive region.

Alternatively, if no active components in a blend fluoresce or the fluorescence is too weak in the desired concentration range then an inert flourophore can be added and used to set a baseline signal. In either case, the initial component added to the mixing tank sets an initial fluorescence signal to compare against the change in signal with the addition of each active component. Fluorometer 116 can have a dedicated channel with the gain values set to provide a suitable dynamic range or a variable gain fluorometer channel can be implemented to use for both blending the additive package and monitoring the process. The addition of TT, step 3, results in a small fluorescence signal gain of 0.04 counts because the volume added is only 28 ml. Adding 161 ml of HEDP, step 4, further dilutes the THSP causing the integrated fluorescence signal to increase. The final addition of 100 ml THSP, step 5, reduces the integrated fluorescence signal down to 0.49 because of self-absorption and quenching at the higher concentration. The set-point values listed in Table 2 for the target concentration levels can be programmed into the controller to automatically send a control signal to start and stop dispensing of the active component.

In step 3, the amount of TT added is small resulting in only a 0.04 signal change. Small changes in signal can be difficult to accurately monitor the blend concentration. To improve the blend accuracy, signal enhancement by simple dilution of the concentrated TT is one approach that will increase the detectable difference before and after addition. For example, starting with concentrated TT of only 21% requires addition of 56 ml to achieve the final 1% target concentration. In this case, the resulting higher dilution increases the signal by 5%.

TABLE 2

Active addition steps to construct the additive blend listed in Table 1 based on fluorescence attenuation.

| Step | Component | Volume (ml) | THSP Signal |
|---|---|---|---|
| 1 | H2O | 611 | — |
| 2 | THSP | 100 | 0.84 |
| 3 | TT | 28 | 0.88 |
| 4 | HEDP | 161 | 1.07 |
| 5 | THSP | 100 | 0.49 |

Example 3

A third aspect of the invention is monitoring and controlling the amount of active added to the holding tank by monitoring fluorescence of a secondary fluorophore component, e.g., PTSA, blended with the concentrated active. The fluorescence from the PTSA monitored by fluorometer 116 (FIG. 1) provides a metric for the active concentration, since the proportion of PTSA to active is known. For example, to construct the additive package in Table 1, HEDP traced with PTSA, can be added first to the holding tank with additional dilution water to set a baseline fluorescent signal count representing a HEDP concentration of the target 11% value for a completed additive package. Controlling the concentration of the subsequent actives is then made by selectively adding or not adding PTSA to concentrated actives. In this case, if the second active added is THSP with no PTSA then the signal measured using the fluorometer tuned for PTSA monitoring will change. The amount of attenuation or gain depending on the concentration level is directly proportional to the amount of THSP added. Addition of the third active, TT, with PTSA added would then result in fluoroscence signal increasing a proportional amount. By selectively including PTSA with specific actives provides a means to increase the measurement sensitivity to control the blend concentration. In this case, the concentration of TT is small relative to HEDP and THSP so the addition of PTSA with TT aids in amplifying the effect of addition and dilution to the blend. The addition of PTSA added at the different steps in making the additive blend can be controlled so the final concentration in the additive blend is in a working range for use as an inert tracing dye for additive dosage control to the process.

Example 4

Figure 4:
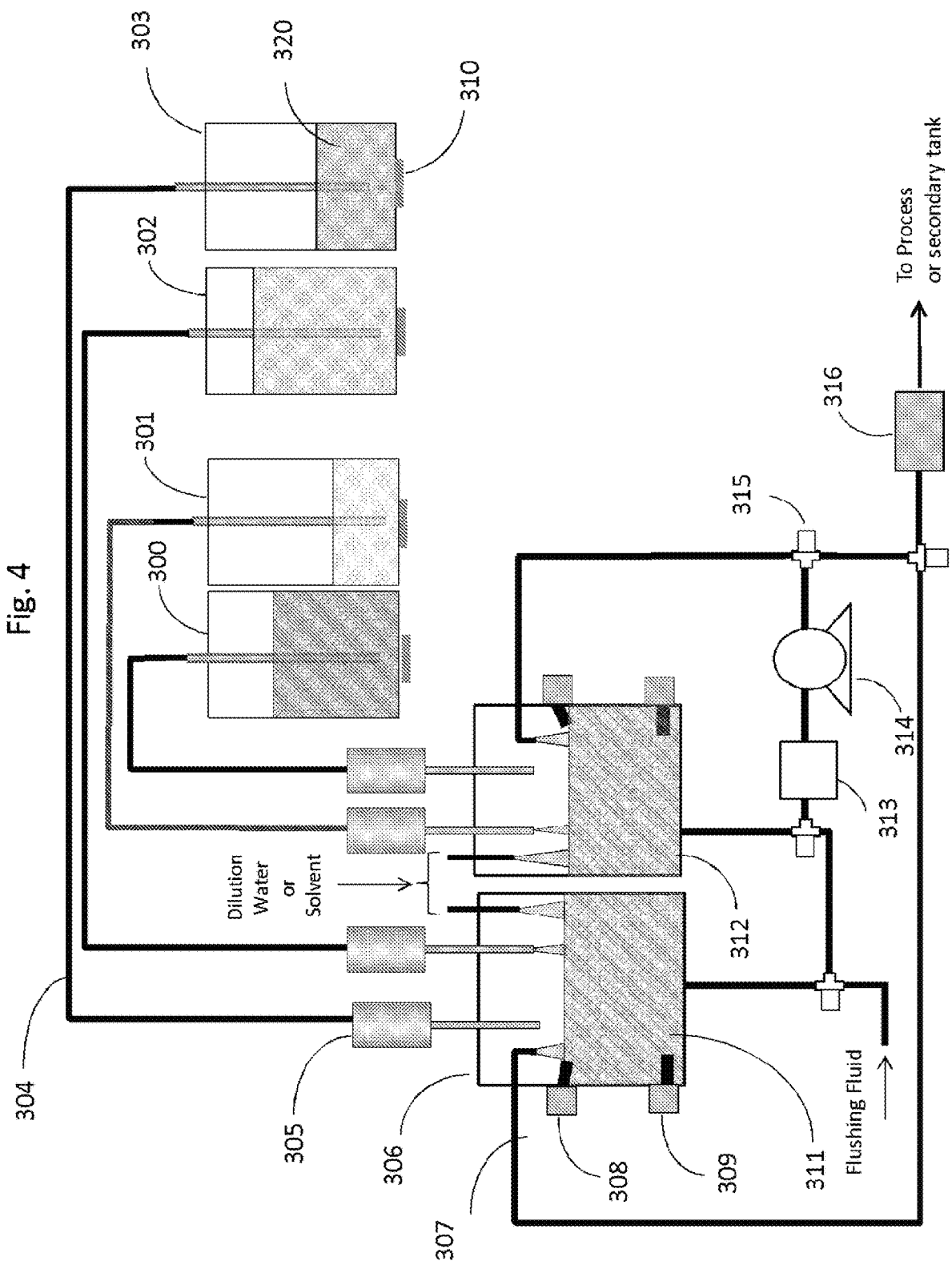
FIG. 4 is a schematic diagram of an embodiment of a batch active blending system for n-components using dedicated mixing tanks for component isolation.

A fourth aspect of the present invention is to dispense chemicals into multiple mixing tanks as shown, for example, in FIG. 4 grouped according to compatible chemistry, e.g., acids and bases, or to react multiple components to generate a new active. In the example illustrated in FIG. 4, two groups of concentrated actives are shown. However, the approach is expandable to n-containers with n-concentrated chemical delivery devices. Chemical dispensing of the concentrated active involves the steps of transporting the fluid to container 306 using a dispensing device 305. The concentration of the dispensed fluid can be monitored by direct fluorescence monitoring of the active component or of an inert fluorophore added to the concentrated active of known concentration. A dedicated flourometer pump 314 can be used for each mixing tank or a single fluorometer with multiple channels either non-dispersive or dispersive can measure the active concentration, as shown in FIG. 4. Concentration monitoring of the active blend using a single fluorometer requires switching sample flow between each container. For the configuration shown in FIG. 4, sample switching between the two tanks 306 is done through controlling solenoid valve 315, with several of these valves shown in the illustration.

Example 5

Figure 5:
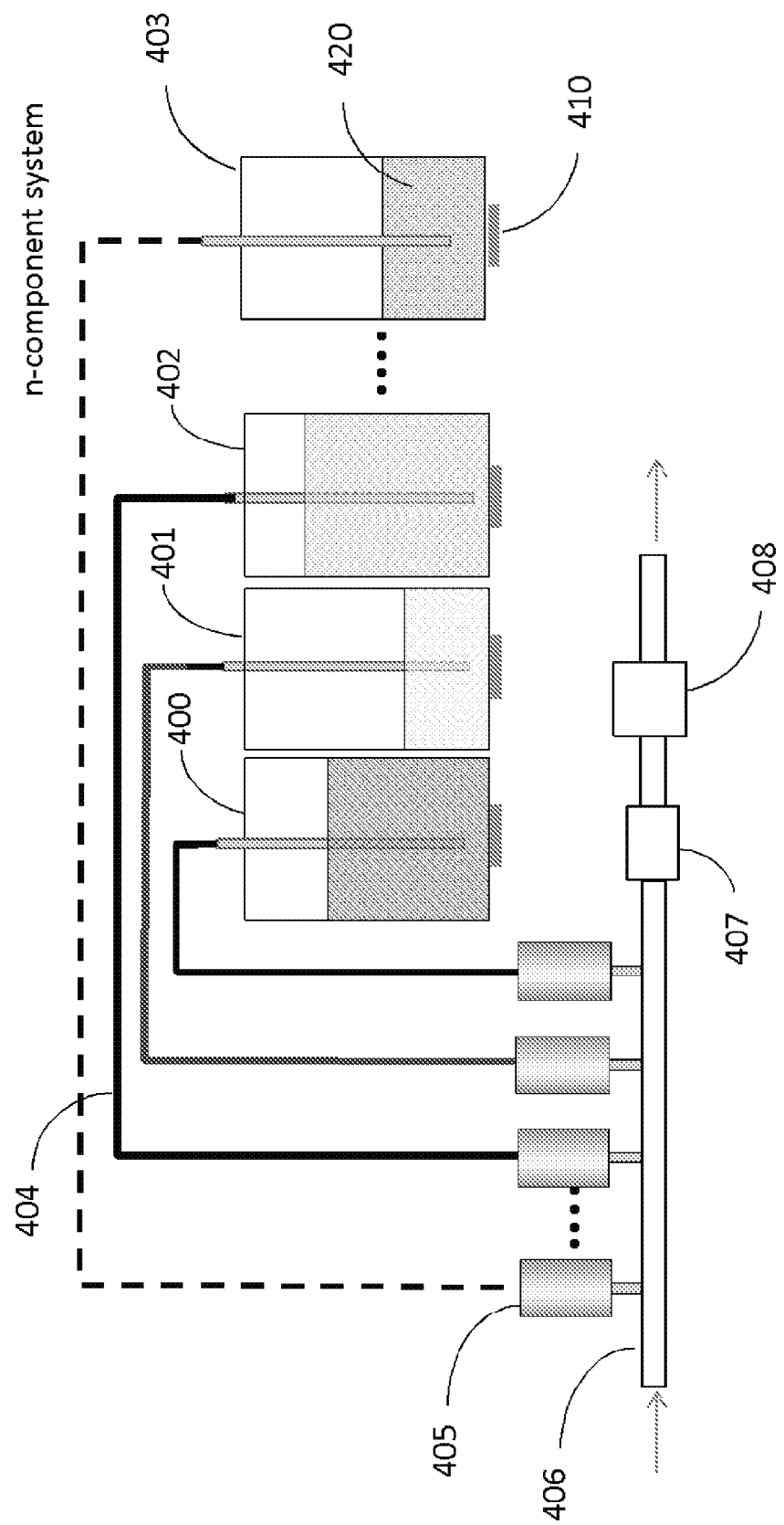
FIG. 5 is a schematic diagram of an embodiment of an active blending system for direct injection into the process stream.

A fifth aspect of the present invention is to directly inject the concentrated active into the process stream or basin. Configuration for direct injection is shown in FIG. 5 for an n-component system. In this example, concentrated active is injected into the process stream by withdrawing liquid simultaneously or at discrete times from the holding containers 400, 401, 402, and n-component 403. Dosing the active to the process is made by withdrawing a controlled amount of the active from the container through delivery line 404 using a fluid dispensing device 405 to deliver the active to a process stream 406. The fluid dispensing device 405 used can be any technology typically used for liquids that include but not limited to mechanical pumping, venturi injector, gravity feed, or displacement methods that such as direct pressurizing the container, bladder system, or progressive cavity displacement. The direct injection could also be of a solid into the liquid stream. Injection points can be on a common process stream, as illustrated in FIG. 5, on different process streams, or at differing locations on the same process stream. Additionally a single injection point can be shared for the addition of the different actives using various methods such as multiport selector valve, multiple inlet venturi, or combination manifold and solenoid valves. Additive injection control at multiple points can be made simultaneously provided the proportion of each additive is controllable. Alternatively, additive injection can be made in a timed sequence, e.g., injection of component 1 followed component 2, etc., and where the sequence of actives injected can vary or be fixed. Active injection can also be controlled based on process demand need. For example, the frequency and amount of a particular active injected into the process can vary depending on the process operating conditions and feed characteristics. Control of the frequency and amount of active injected is made by coupling the dispensing system to an optimization protocol.

Monitoring the amount of active directly injected to the process can be made using a load cell 410 if the resolution is acceptable. Weight based monitoring using load cells can be made either by directly tracking the weight of the concentrated active or using a secondary smaller volume holding vessel as shown, for example, in FIG. 2 to achieve higher resolution measurements when the concentrated active supply source is a large volume container. A fluorometer 408 can also be used to measure direct fluorescence of the active or fluorescence of an inert traced fluorophore added to an active in the presences of another fluid, e.g., process water. Any of several other sensors could theoretically be used depending on the parameter to be monitored, and several of those other sensors are listed throughout this application. In this case, a flow meter 407 may also be needed, where flow meter 407 and fluorometer 408 monitor the process fluid downstream of the injection point(s) of the active(s), allowing the user to determine the concentration of the actives that had been added to the system based on the integrated fluorescence signal over time. Fluorescence monitoring of the additive directly after the injection point can also serve as an alarming monitor to insure the additive is being dispensed.

Example 6

A sixth aspect of the present invention is to dispense chemicals into a holding vessel to make an additive package, transport the holding vessel containing the additive package to the point-of-use, and dispensing the additive package from the holding vessel at the point-of-use. In this case the holding vessel is mobile so the additive package made at the chemical dispensing system is transported to the process or distribution system for dispensing. Any of the delivery systems or methods described above can be used to make the additive package. This approach can be used in cases where a manufacturing plant has multiple unit operations using a similar set of components with the same or differing concentrations. For example, a manufacturing plant with several water cooling towers disturbed throughout their facility may use an additive package with common components consisting of an azole, a dispersant polymer, orthophosophate, and phosphonobutanetricarboxylic acid. These main components can be common for each cooling tower, but the concentration may differ. The optimal additive package can differ for each tower because of tower age; material of construction, operating conditions, etc., as well as feed rate. Sizing the additive package holding vessel will depend on the feed rate and variability of the process, i.e., the frequency required to adjust the concentration of the additive package components to maintain optimal performance. The optimal additive blend concentration can be preprogramed into a controller for a given tower or defined set of operating conditions, manually inputted by the user, or automated to adjust based on information collected on the process operating conditions and feed input characteristics.

Having a blending system located onsite provides flexibility to adjust feed concentrations and type of chemicals supplied to each unit operation, thereby maintaining optimal performance. Use of mobile containers to transport the additive package to the point-of-use allows the user to size the container accordingly. For example, if a frequent change in the chemical components or concentration is required then a smaller additive holding container is desirable to avoid blending an access volume of additive. Smaller additive holding container also has the advantage of working with a reduced footprint, which is beneficial when space is a premium. Proper management of the additive package holding container size and replenishment frequency also helps in reducing potential shelf-life stability issues that can occur for certain additive combinations. In these cases, additional chemicals are generally added as a stabilizer. However, a properly sized container can shorten the shelf-life of the additive package reducing the needed for stabilizers in some cases. The standard approach of supplying and additive package blended at a manufacturing facility and shipped to the site cannot address all of these functional attributes offered by using an onsite additive blending system.

In general all of the different system configurations described here can be used if the active dosed to the process can be directly monitored using fluorescence or the active is traced with an inert dye if using a TRASAR closing methodology. When using a IRASAR method, a dye of known amount must also be added to the additive blend or could be introduced through a venturi with a known dilution ratio. In either case, a target set point level, e.g., 100 ppm +/− 10 ppm, with upper and lower limits is used to control the amount of additive dispensed. In cases where TRASAR technology is not used, a bleed and feed approach may be used, or any approach known by those skilled in the art.

In any case, blending the additives at the point of use or direct injection has the advantage of real-time customized control of the additive composition. For example, if the makeup water quality changed or the cooling tower is experiencing higher corrosion, then the additive blend can be adjusted on site, tested, and readjusted if needed. This approach is not practical using the traditional additive packages supplied as a blended drum of actives where any reformulation to adjust the composition is both costly and time consuming.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the illustrated specific embodiments or examples is intended or should be inferred. The disclosure is intended to cover by the appended claims all such modifications as fall within the scope of the claims.

We claim:

1. A method of preparing an additive package having a base solvent and a plurality of concentrated active ingredients, the method comprising:

dosing a volume of a first concentrated active ingredient of the plurality of concentrated active ingredients into the base solvent to form a first blend, wherein the first concentrated active ingredient comprises a first concentrated fluorophore;

monitoring a fluorescence response of the first concentrated fluorophore in the first blend as compared to a first fluorometric set point sensitive to concentration changes, wherein the dosing of the first concentrated active ingredient continues until the fluorescence response of the first concentrated fluorophore reaches the first fluorometric set point sensitive to concentration changes;

upon the fluorescence response of the first concentrated fluorophore reaching the first fluorometric set point, dosing a volume of a second concentrated active ingredient of the plurality of concentrated active ingredients into the first blend to form a second blend, wherein the second concentrated active ingredient is different than the first concentrated active ingredient, wherein the first blend does not include the second concentrated active ingredient, and monitoring the fluorescence response of the first concentrated fluorophore in the second blend to a second fluorometric set point sensitive to concentration changes wherein the second fluorometric set point is different than the first fluorometric set point, wherein the dosing of the second concentrated active ingredient continues until the fluorescence response of the first concentrated fluorophore reaches the second fluorometric set point sensitive to concentration changes.

2. The method of claim 1, further comprising, upon the fluorescence response of the first concentrated fluorophore reaching the second fluorometric set point, dosing a second volume of the first concentrated active ingredient comprising the first concentrated fluorophore into the second blend to form a third blend; and monitoring the fluorescence response of the first concentrated fluorophore in the third blend to a third fluorometric set point sensitive to concentration changes.

3. The method of claim 1, further comprising, upon the fluorescence response of the first concentrated fluorophore reaching the second fluorometric set point, dosing a third concentrated active ingredient of the plurality of concentrated active ingredients into the second blend to form a third blend, wherein the third concentrated active ingredient is different than the first concentrated active ingredient and the second concentrated active ingredient and wherein the second blend does not include the third concentrated active ingredient, wherein the dosing of the third concentrated active ingredient continues until the fluorescence response of the first concentrated fluorophore reaches a third fluorometric set point sensitive to concentration changes, wherein the third fluorometric set point is different than the first fluorometric set point and the second fluorometric set point.

4. The method of claim 3, further comprising monitoring the fluorescence response of the first concentrated fluorophore in the third blend to the third fluorometric set point sensitive to concentration changes.

5. The method of claim 4, further comprising, upon the fluorescence response of the first concentrated fluorophore reaching the third fluorometric set point, dosing a second volume of the first concentrated active ingredient comprising the first concentrated fluorophore into the third blend to form a fourth blend; and monitoring the fluorescence response of the first concentrated fluorophore in the fourth blend to a fourth fluorometric set point sensitive to concentration changes.

6. The method of claim 1, wherein the first concentrated active ingredient and the first concentrated fluorophore are the same chemical.

7. The method of claim 6, wherein the first concentrated active ingredient and the first concentrated fluorophore are a corrosion inhibitor.

8. The method of claim 7, wherein the first concentrated active ingredient and the first concentrated fluorophore are poly acrylic acid tagged dispersant.

9. The method of claim 1, wherein the base solvent comprises water.

10. The method of claim 1, wherein the second concentrated active ingredient comprises a second corrosion inhibitor.

11. The method of claim 1, wherein the first concentrated active ingredient comprises a corrosion inhibitor.

12. The method of claim 11, wherein the first concentrated fluorophore comprises an inert tracer.

13. The method of claim 1, wherein the second concentrated active ingredient comprises a scale inhibitor.

14. The method of claim 1, wherein the first concentrated active ingredient comprises a scale inhibitor.

15. The method of claim 14, wherein the first concentrated fluorophore comprises an inert tracer.

16. The method of claim 5, wherein the first concentrated active ingredient and the first concentrated fluorophore are the same chemical.

17. The method of claim 16, wherein the first concentrated active ingredient and the first concentrated fluorophore are a corrosion inhibitor.

18. The method of claim 17, wherein the first concentrated active ingredient and the first concentrated fluorophore are poly acrylic acid tagged dispersant.

19. The method of claim 18, wherein the second concentrated active ingredient comprises a second corrosion inhibitor.

20. The method of claim 19, wherein the third concentrated active ingredient comprises a scale inhibitor.

* * * * *